United States Patent
Tsukada

(10) Patent No.: US 12,309,521 B2
(45) Date of Patent: May 20, 2025

(54) IMAGE REGISTRATION APPARATUS, IMAGE GENERATION SYSTEM, IMAGE REGISTRATION METHOD, AND IMAGE REGISTRATION PROGRAM PRODUCT

(71) Applicant: DENSO CORPORATION, Kariya (JP)

(72) Inventor: Akihiro Tsukada, Kariya (JP)

(73) Assignee: DENSO CORPORATION, Kariya (JP)

( * ) Notice: Subject to any disclaimer, the term of this patent is extended or adjusted under 35 U.S.C. 154(b) by 514 days.

(21) Appl. No.: 17/654,012

(22) Filed: Mar. 8, 2022

(65) Prior Publication Data

US 2022/0201164 A1 Jun. 23, 2022

Related U.S. Application Data

(63) Continuation of application No. PCT/JP2020/033956, filed on Sep. 8, 2020.

(30) Foreign Application Priority Data

Sep. 10, 2019 (JP) .................. 2019-164860

(51) Int. Cl.
G06T 7/73 (2017.01)
G06T 7/194 (2017.01)
(Continued)

(52) U.S. Cl.
CPC ........... *H04N 5/2226* (2013.01); *G06T 7/194* (2017.01); *G06T 7/73* (2017.01); *H04N 23/951* (2023.01);
(Continued)

(58) Field of Classification Search
None
See application file for complete search history.

(56) References Cited

U.S. PATENT DOCUMENTS 8,295,547 B1 * 10/2012 Cangiani ................. G01S 17/66
382/103
11,019,249 B2 * 5/2021 Kimura .............. G01B 11/2513
(Continued)

FOREIGN PATENT DOCUMENTS

JP 2014-207493 A 10/2014
JP 2018-069878 A 5/2018
(Continued)

OTHER PUBLICATIONS

U.S. Appl. No. 17/655,424, filed Mar. 18, 2022, Tsukada.
U.S. Appl. No. 17/654,015, filed Mar. 8, 2022, Tsukada.

*Primary Examiner* — Tsung Yin Tsai
(74) *Attorney, Agent, or Firm* — Maschoff Brennan

(57) ABSTRACT

An image registration apparatus is communicably connected with a distance measuring sensor and a camera. The image registration apparatus is configured to: acquire a reflected light image, which includes distance information, and a background light image from the distance measuring sensor; acquire a camera image from the camera; and execute an image registration to the reflected light image, which has a same coordinate system as a coordinate system of the background light image, and the camera image by specifying a correspondence relationship between a feature point in the background light image and a feature point in the camera image.

9 Claims, 7 Drawing Sheets

(51) Int. Cl.
*H04N 5/222* (2006.01)
*H04N 23/951* (2023.01)

(52) U.S. Cl.
CPC ............... *G06T 2207/10028* (2013.01); *G06T 2207/30252* (2013.01)

(56) References Cited

U.S. PATENT DOCUMENTS

| | | | | |
|---|---|---|---|---|
| 2007/0086675 | A1* | 4/2007 | Chinen | G06T 11/00 382/284 |
| 2013/0335528 | A1* | 12/2013 | Vishwanath | G06T 17/00 348/46 |
| 2013/0335535 | A1* | 12/2013 | Kane | G01B 11/2513 348/50 |
| 2015/0104563 | A1* | 4/2015 | Lowe | G01N 21/8806 250/341.1 |
| 2016/0205341 | A1* | 7/2016 | Hollander | H04N 19/46 375/240.08 |
| 2018/0284235 | A1 | 10/2018 | Ohtomo et al. | |
| 2019/0108743 | A1* | 4/2019 | Kimura | G08B 21/0261 |
| 2019/0162823 | A1 | 5/2019 | Eckstein et al. | |
| 2019/0220997 | A1* | 7/2019 | Asai | G01C 21/3822 |
| 2020/0358961 | A1* | 11/2020 | Kimura | H04N 23/69 |
| 2022/0201164 | A1* | 6/2022 | Tsukada | G06T 7/194 |

FOREIGN PATENT DOCUMENTS

| | | | |
|---|---|---|---|
| JP | 2021-043044 | A | 3/2021 |
| JP | 2021-050945 | A | 4/2021 |

\* cited by examiner

IMAGE REGISTRATION APPARATUS, IMAGE GENERATION SYSTEM, IMAGE REGISTRATION METHOD, AND IMAGE REGISTRATION PROGRAM PRODUCT

CROSS REFERENCE TO RELATED APPLICATIONS

The present application is a continuation application of International Patent Application No. PCT/JP2020/033956 filed on Sep. 8, 2020, which designated the U.S. and claims the benefit of priority from Japanese Patent Application No. 2019-164860 filed on Sep. 10, 2019. The entire disclosures of all of the above applications are incorporated herein by reference.

TECHNICAL FIELD

The present disclosure relates to an image registration apparatus, an image generation system, an image registration method, and an image registration program product.

BACKGROUND

There has been known a distance measuring sensor that measures a distance to a target, and a camera that detects incident light using a camera element and generates a high-resolution camera image based on the received light.

SUMMARY

The present disclosure provides an image registration apparatus, which is communicably connected with a distance measuring sensor and a camera. The image registration apparatus is configured to: acquire a reflected light image including distance information and a background light image from the distance measuring sensor; acquire a camera image from the camera; and execute an image registration to the reflected light image, which has a same coordinate system as a coordinate system of the background light image, and the camera image by specifying a correspondence relationship between a feature point in the background light image and a feature point in the camera image.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
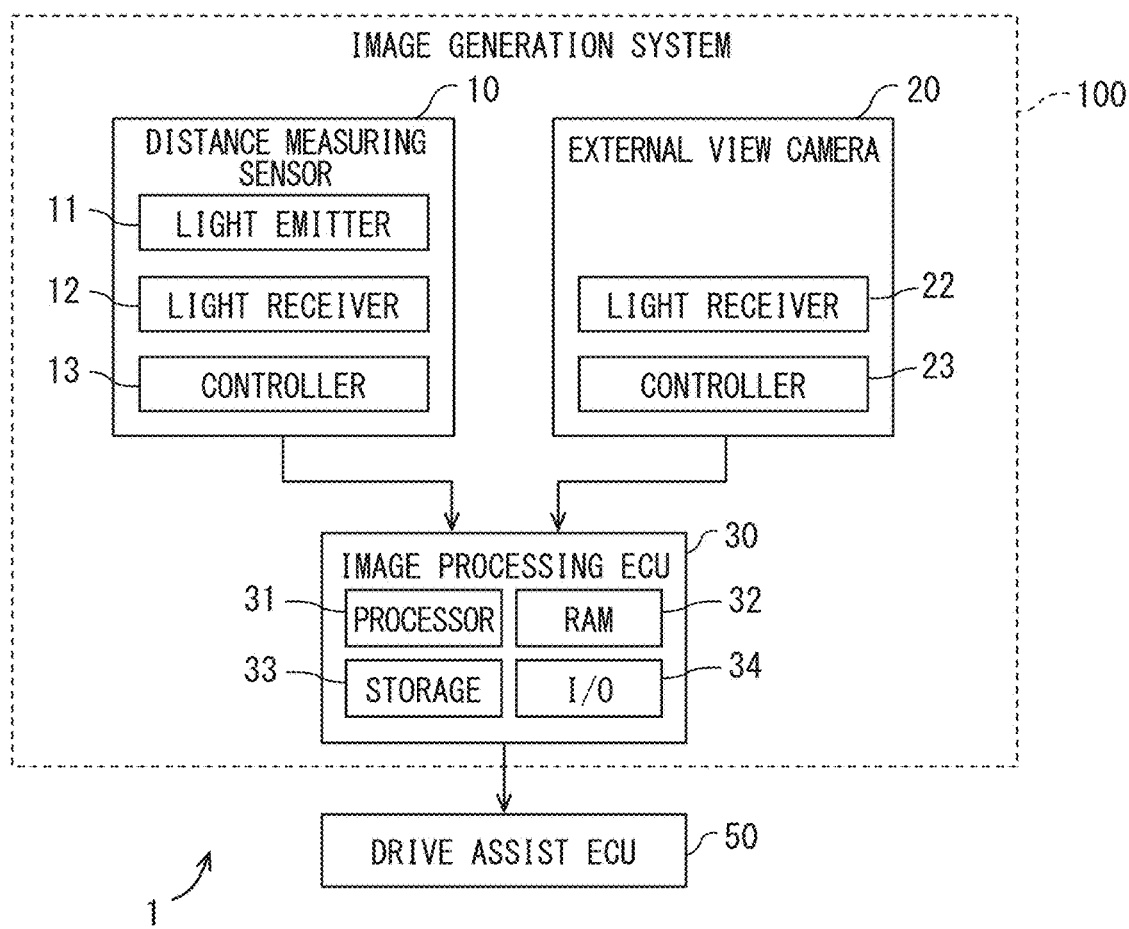
FIG. 1 is a diagram showing an overall configuration of an image generation system and a driving assist ECU according to a first embodiment of the present disclosure.

There has been known a distance measuring sensor that measures a distance to a target. Usually, a distance measuring sensor generates a reflected light image including distance information by detecting and receiving, using a light receiving element, the reflected light from an object toward which light is emitted. Further, there has been known a camera that detects incident light from the outside using a camera element and generates a high-resolution camera image based on the received light.

The reflected light image and the camera image may be processed by an application program. Hereinafter, the application program is also referred to as application. Usually, there exists a measurement time difference $\Delta t$ between a measurement time of the reflected light image and a measurement time of the camera image. When the object included in both of the reflected light image and the camera image moves during the measurement time difference $\Delta t$, it becomes difficult to accurately associate the object included in the reflected light image with the object included in the camera image. Therefore, even when the application uses both of the reflected light image and the camera image, it is difficult to fully utilize the information included in both of the reflected light image and the camera images, and thereby improving the processing accuracy.

According to an aspect of the present disclosure, an image registration apparatus is communicably connected with a distance measuring sensor and a camera. The distance measuring sensor generates a reflected light image, which includes distance information, by emitting light toward an object and sensing, with a light receiving element, reflected light from the object. The distance measuring sensor further generates a background light image, which has a same coordinate system as a coordinate system of the reflected light image, by sensing, with the light receiving element, background light with respect to the reflected light. The camera generates a camera image by sensing incident light with a camera element. The camera image has a resolution higher than a resolution of the reflected light image and a resolution of the background light image. The image registration apparatus includes: an image acquisition unit acquiring the reflected light image, the background light image, and the camera image; and an image processing unit executing an image registration to the reflected light image, which has the same coordinate system as the coordinate system of the background light image, and the camera image by specifying a correspondence relationship between a feature point in the background light image and a feature point in the camera image.

In the above apparatus, image registration between the acquired reflected light image and the acquired camera image is performed using the background light image that has the same coordinate system as that of the reflected light image. The background light image has characteristic closer to characteristic of the camera image compared with the reflected light image. Thus, by comparing the feature point of the background light image with the feature point of the camera image, it becomes easy to specify the correspondence relationship between the feature point of the background light image and the feature point of the camera image. By such correlation, the coordinate system of the reflected light image can be accurately matched with the coordinate system of the camera image. Thus, a processing accuracy of the application using both of the reflected light image and the camera image can be remarkably improved.

According to another aspect of the present disclosure, an image generation system, which generates an image to be used in an application program, includes: distance measuring sensor generating a reflected light image, which includes distance information, by emitting light toward an object and sensing, with a light receiving element, reflected light from the object, the distance measuring sensor further generating a background light image, which has a same coordinate system as a coordinate system of the reflected light image, by sensing, with the light receiving element, background light with respect to the reflected light; a camera generating a camera image by sensing incident light with a camera element, the camera image having a resolution higher than a resolution of the reflected light image and a resolution of the background light image; and an image registration apparatus including an image processing unit, the image processing unit generating a composite image in which the distance information of the reflected light image is combined with the camera image by executing an image registration to the reflected light image, which has the same coordinate system as the coordinate system of the background light image, and the camera image, the image processing unit specifying a correspondence relationship between a feature point in the background light image and a feature point in the camera image as the image registration.

In the above system, image registration between the reflected light image and the camera image is performed using the background light image that has the same coordinate system as that of the reflected light image. The background light image has characteristic closer to characteristic of the camera image compared with the reflected light image. Thus, by comparing the feature point of the background light image with the feature point of the camera image, it becomes easy to specify the correspondence relationship between the feature point of the background light image and the feature point of the camera image. By such correlation, the coordinate system of the reflected light image can be accurately matched with the coordinate system of the camera image. Then, the distance information provided by the distance measuring and the camera image information provided by the camera, which are information provided by different image generation sources, can be provided in a form of composite image that can be easily processed by the application. Thus, a processing accuracy of the application using both of the reflected light image and the camera image can be remarkably improved.

According to another aspect of the present disclosure, an image generation method comprising: preparing, using a distance measuring sensor, a reflected light image and a background light image, the distance measuring sensor generating the reflected light image, which includes distance information, by emitting light toward an object and sensing, with a light receiving element, reflected light from the object, the distance measuring sensor further generating the background light image, which has a same coordinate system as a coordinate system of the reflected light image, by sensing, with the light receiving element, background light with respect to the reflected light; preparing, using a camera, a camera image, the camera generating the camera image by sensing incident light with a camera element, the camera image having a resolution higher than a resolution of the reflected light image and a resolution of the background light image; detecting a feature point in the background light image and a feature point in the camera image, respectively; specifying a correspondence relationship between the feature point in the background light image and the feature point in the camera image; and correlating, based on the specified correspondence relationship, each pixel in the background light image with a corresponding pixel in the camera image.

In the above method, the feature point of the prepared background light image and the feature point of the prepared camera image are detected, respectively. Then, the correspondence relationship between the detected feature point of the background light image and the feature point of the camera image is specified. Then, each pixel of the background light image is correlated with corresponding pixel of the camera image based on the specified result of the correspondence relationship. As described above, the image registration between the reflected light image and the camera image is performed using the background light image. The background light image has the same coordinate system as that of the reflected light image, and has characteristic closer to that of the camera image compared with the reflected light image. Thus, it becomes easy to specify the correspondence relationship between the feature point of the reflected light image and the feature point of the camera image. By such correlation, the coordinate system of the reflected light image can be accurately matched with the coordinate system of the camera image. Thus, a processing accuracy of the application using both of the reflected light image and the camera image can be remarkably improved. After specifying the correspondence relationship between the feature point of the reflected light image and the feature point of the camera image, the coordinate of each pixel in the reflected light image is correlated with corresponding pixel in the camera image based on the specified correspondence relationship. Thus, highly accurate image registration can be executed with reduced processing load and increased processing speed compared with a case where the correspondence relationship of each pixel is specified with other methods.

According to another aspect of the present disclosure, an image registration program product is stored in a computer-readable non-transitory storage medium, and includes instructions to be executed by at least one processor for performing an image registration to an image generated by a distance measuring sensor and an image generated by a camera. The instructions includes: acquiring a reflected light image and a background light image from the distance measuring sensor, the distance measuring sensor generating the reflected light image, which includes distance information, by emitting light toward an object and sensing, with a light receiving element, reflected light from the object, the distance measuring sensor further generating the background light image, which has a same coordinate system as a coordinate system of the reflected light image, by sensing, with the light receiving element, background light with respect to the reflected light; acquiring a camera image from the camera, the camera generating the camera image by sensing incident light with a camera element, the camera image having a resolution higher than a resolution of the reflected light image and a resolution of the background light image; detecting a feature point in the background light image and a feature point in the camera image, respectively; specifying a correspondence relationship between the feature point in the background light image and the feature point in the camera image; and correlating, based on the specified correspondence relationship, each pixel in the background light image with a corresponding pixel in the camera image.

In the above program product, the feature point of the acquired background light image and the feature point of the camera image are detected, respectively. Then, the correspondence relationship between the detected feature point of the background light image and the detected feature point of the camera image is specified. Then, each pixel of the background light image is correlated with corresponding pixel of the camera image based on the specified result of the correspondence relationship. As described above, the image registration between the reflected light image and the camera image is performed using the background light image. The background light image has the same coordinate system as that of the reflected light image, and has characteristic closer to that of the camera image compared with the reflected light image. Thus, it becomes easy to specify the correspondence relationship between the feature point of the reflected light image and the feature point of the camera image. By such correlation, the coordinate system of the reflected light image can be accurately matched with the coordinate system of the camera image. Thus, a processing accuracy of the application using both of the reflected light image and the camera image can be remarkably improved. After specifying the correspondence relationship between the feature point of the reflected light image and the feature point of the camera image, the coordinate of each pixel in the reflected light image is correlated with corresponding pixel in the camera image based on the specified correspondence relationship. Thus, highly accurate image registration can be executed with reduced processing load and increased processing speed compared with a case where the correspondence relationship of each pixel is specified with other methods.

The following will describe embodiments of the present disclosure with reference to accompanying drawings. It is noted that the same reference symbols are attached to the corresponding constituent elements in each embodiment, and redundant explanation may be omitted. In each of the embodiments, when only a part of the configuration is described, the remaining parts of the configuration may adopt corresponding parts of other embodiments. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

As shown in FIG. 1, the image registration apparatus according to a first embodiment of the present disclosure is applied to a vehicle 1, which corresponds to a moving body. In the present embodiment, the image registration apparatus is provided by an image processing electronic control unit (ECU) 30 mounted on the vehicle 1. The image processing ECU 30 is included in an image generation system 100. The image generation system 100 further includes a distance measuring sensor 10 and an external view camera 20. The image generation system 100 of the present embodiment can generate peripheral monitoring image information in which the measurement result of the distance measuring sensor 10 is integrated with the image captured by the external view camera 20. The image generation system 100 provides the generated information to a driving assist ECU 50, or the like.

The image processing ECU 30 is communicably connected to a communication bus of an in-vehicle network mounted on the vehicle 1. The image processing ECU 30 is one of nodes connected to the in-vehicle network. The distance measuring sensor 10, the external view camera 20, and the driving assist ECU 50 are also connected to the communication bus of the in-vehicle network as nodes.

The driving assist ECU 50 mainly includes a computer equipped with a processor, random access memory (RAM), a storage unit, an input/output interface, and a bus connecting these elements. The driving assist ECU 50 includes at least one of a driving assist function that assists the driver's driving operation of the vehicle 1 or a substitute driving function that substitutes the driver's driving operation of the vehicle 1. The driving assist ECU 50 recognizes, by executing a program stored in a storage medium using the processor, a surrounding environment of the vehicle 1 based on the peripheral monitoring image information acquired from the image generation system 100. The driving assist ECU 50 performs autonomous driving or advanced driving assist of the vehicle 1 according to the recognition result acquired by executing the program stored in the storage medium using the processor.

The following will describe details of the distance measuring sensor 10, the external view camera 20, and the image processing ECU 30 included in the image generation system 100.

The distance measuring sensor 10 may be provided by a single photon avalanche diode light detection and ranging (SPAD LiDAR) disposed on a front portion of the vehicle 1 or on a roof of the vehicle 1. The distance measuring sensor 10 measures a distance at least within a front range MA1 of the vehicle 1 among a periphery area of the vehicle 1. The front range MA1 measured by the distance measuring sensor 10 is also referred to as a front measurement range MA1.

Figure 2:
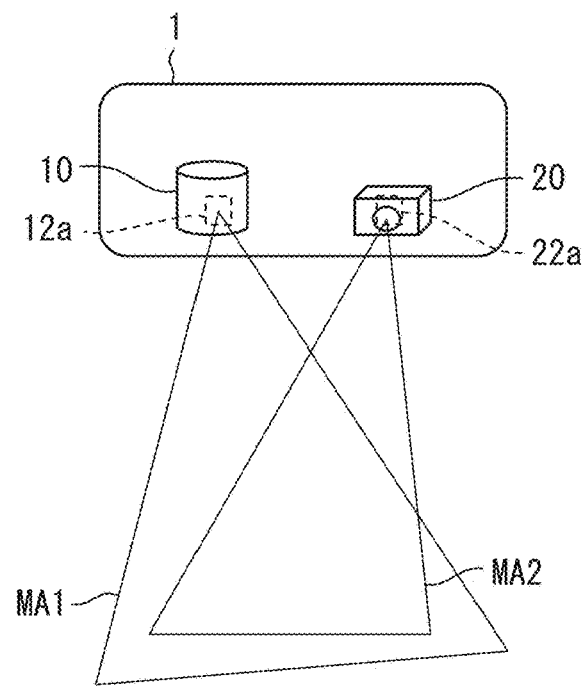
FIG. 2 is a diagram showing a distance measuring sensor and an external view camera mounted to a vehicle according to the first embodiment.

The distance measuring sensor 10 includes a light emitter 11, a light receiver 12, a controller 13, and the like. The light emitter 11 emits light from a light source toward the measurement range MA1 as shown in FIG. 2 by scanning the measurement range using a movable optical member, such as a polygon mirror. For example, the light source may be a semiconductor laser, such as a laser diode. The light source emits, corresponding to an electric signal provided by the controller 13, the light of near infrared region. The light of near infrared region is invisible to occupants in the vehicle and other people outside of the vehicle.

The light receiver 12 collects, within the measurement range MA1, the reflected light from the object or background light relative to the reflected light by, for example, a condenser lens, and controls the collected light to be enter a light receiving element 12a.

The light receiving element 12a converts the received light into an electric signal by photoelectric conversion. The light receiving element 12a may be provided by a SPAD light receiving element that has a high sensitivity by amplifying a detection voltage. For example, the light receiving element 12a may be provided by a CMOS sensor that has a high sensitivity in the near infrared region compared with the visible region for detecting the reflected light of the near infrared region. This sensitivity of the light receiving element 12a may be adjusted by providing an optical filter in the light receiver 12. The light receiving element 12a has multiple light receiving pixels arranged as an array in one-dimensional direction or two-dimensional directions.

The controller 13 controls operations of the light emitter 11 and the light receiver 12. For example, the controller 13 may be arranged on a common substrate together with the light receiving element 12a, and mainly includes a broad-meaning processor, such as a microcomputer or a field-programmable gate array (FPGA). The controller 13 has a scanning control function, a reflected light measuring function, and a background light measuring function.

The scanning control function is a function for controlling scanning of light. The controller 13 oscillates the light emitted from the light source by multiple times to have a pulse shape based on an operating clock of a clock oscillator included in the distance measuring sensor 10, and operates the movable optical member.

The reflected light measuring function is a function of reading out, according to the scan timing of the light, a voltage value corresponding to the reflected light received by each light receiving pixel with, for example, a rolling shutter method, and measuring an intensity of the received reflected light. In the measurement of the reflected light, a distance from the distance measuring sensor 10 to the object on which the light is reflected can be measured by detecting a time difference between the emission time of the light and the receiving time of the reflected light. By measuring the reflected light, the controller 13 generates, as the reflected light image, image data in which the intensity of the reflected light is associated with the distance information of the object on which the emitted light is reflected in two-dimensional coordinates of an image plane corresponding to the measurement range MA1.

The background light measurement function is a function of reading out a voltage value corresponding to the background light received by each light receiving pixel at a time point immediately before measuring of the reflected light, and measuring the intensity of the background light. Here, the background light is incident light entering the light receiving element 12a from the measurement range MA1 among the external area, and does not include the reflected light. The incident light includes natural light, light from an external display, and the like. By measuring the background light, the controller 13 can generate, as the background light image ImL, image-like data in which the intensity of the background light is associated with the two-dimensional coordinates in the image plane corresponding to the measurement range MA1.

The reflected light image and the background light image ImL are sensed by the same light receiving element 12a, and acquired from the same optical system including the light receiving element 12a. Therefore, the coordinate system of the reflected light image can be regarded as the same and coincident coordinate system as the coordinate system of the background light image ImL. Furthermore, there is almost no difference between the measurement time of the reflected light image and the measurement time of the background light image ImL. For example, the time difference may be less than 1 nanosecond). Thus, the reflected light image and the background light image ImL can be regarded as synchronized images.

In the present embodiment, the image data in which three data channels including the intensity of the reflected light, the distance of the object, and the intensity of the background light are stored for each pixel is successively output to the image processing ECU 30 as the sensor image.

The external view camera 20 may be a camera arranged in a vehicle compartment close to a front windshield of the vehicle 1. The external view camera 20 is able to measure at least a measurement range MA2 set in front of the vehicle on external side. More specifically, the measurement range MA2 is set to at least partially overlap with the measurement range MA1 of the distance measuring sensor 10.

The external view camera 20 includes a light receiver 22 and a controller 23. The light receiver 22 collects incident light (background light) from the measurement range MA2 of external area by, for example, a light receiving lens, and controls the collected light to enter a camera element 22a.

The camera element 22a converts light into an electric signal by photoelectric conversion. For example, a CCD sensor or a CMOS sensor can be adopted as the camera element 22a. The camera element 22a is set to have high sensitivity in the visible region compared with the near infrared region in order to efficiently receive natural light in the visible region. The camera element 22a has multiple light receiving pixels (corresponding to sub-pixels) arranged as an array in two-dimensional directions. For example, red, green, and blue color filters may be arranged on the light receiving pixels adjacent to one another. Each light receiving pixel receives visible light of a color corresponding to the arranged color filter. By measuring the intensity of red light, the intensity of green light, and the intensity of blue light, the camera image ImC captured by the external view camera 20 has a higher resolution compared with the reflected light image and the background light image ImL. The camera image may be a visible color image.

The controller 23 controls operations of the light receiver 22. For example, the controller 23 may be arranged on a common substrate together with the camera element 22a, and mainly includes a broad-meaning processor, such as a microcomputer or a FPGA. The controller 23 has an image capturing function.

The image capturing function is a function for capturing a color image as described above. The controller 23 reads out, according to an operating clock of a clock oscillator included in the external view camera 20, a voltage value corresponding to the incident light received by each light receiving pixel using, for example, a global shutter method, and measures an intensity of the sensed incident light. This clock oscillator of the external view camera 20 is provided independently of the clock oscillator of the distance measuring sensor 10. The controller 23 can generate, as a camera image ImC, image-like data in which the intensity of incident light is associated with the two-dimensional coordinates on the image plane corresponding to the measurement range MA2. Such camera images ImC are successively output to the image processing ECU 30.

The distance measuring sensor 10 operates based on the clock oscillator different from the clock oscillator of the external view camera 20, and in most of cases, the measurement time cycle (that is, frame rates) of the distance measuring sensor 10 is different from the measurement time cycle of the external view camera 20. Thus, a measurement time difference $\Delta t$ may be generated between the measurement time of the reflected light image or the background light image ImL and the measurement time of the camera image ImC. The measurement time difference $\Delta t$ may be 1000 times or more of the measurement time difference between the reflected light image and the background light image ImL.

The image processing ECU 30 is an electronic control device that performs an image processing in combined manner using the reflected light image, the background light image ImL, and the camera image ImC. The image processing ECU 30 mainly includes a computer equipped with a processor 31, a RAM 32, a storage 33, an input/output interface 34, and a bus connecting these elements. The processor 31 is combined with the RAM 32, and is provided by a hardware for executing an arithmetic processing. The processor 31 includes at least one arithmetic core, such as a central processing unit (CPU), a graphical processing unit (GPU), or a reduced instruction set computer (RISC). The processor 31 may further include an FPGA and an IP core having different dedicated functions. The RAM 32 may include a video RAM for generating images. The processor 31 executes, by accessing the RAM 32, various processes for functioning as the functional blocks described later. The storage 33 includes a non-volatile storage medium. The storage 33 stores various programs (image registration program, etc.) to be executed by the processor 31.

Figure 3:
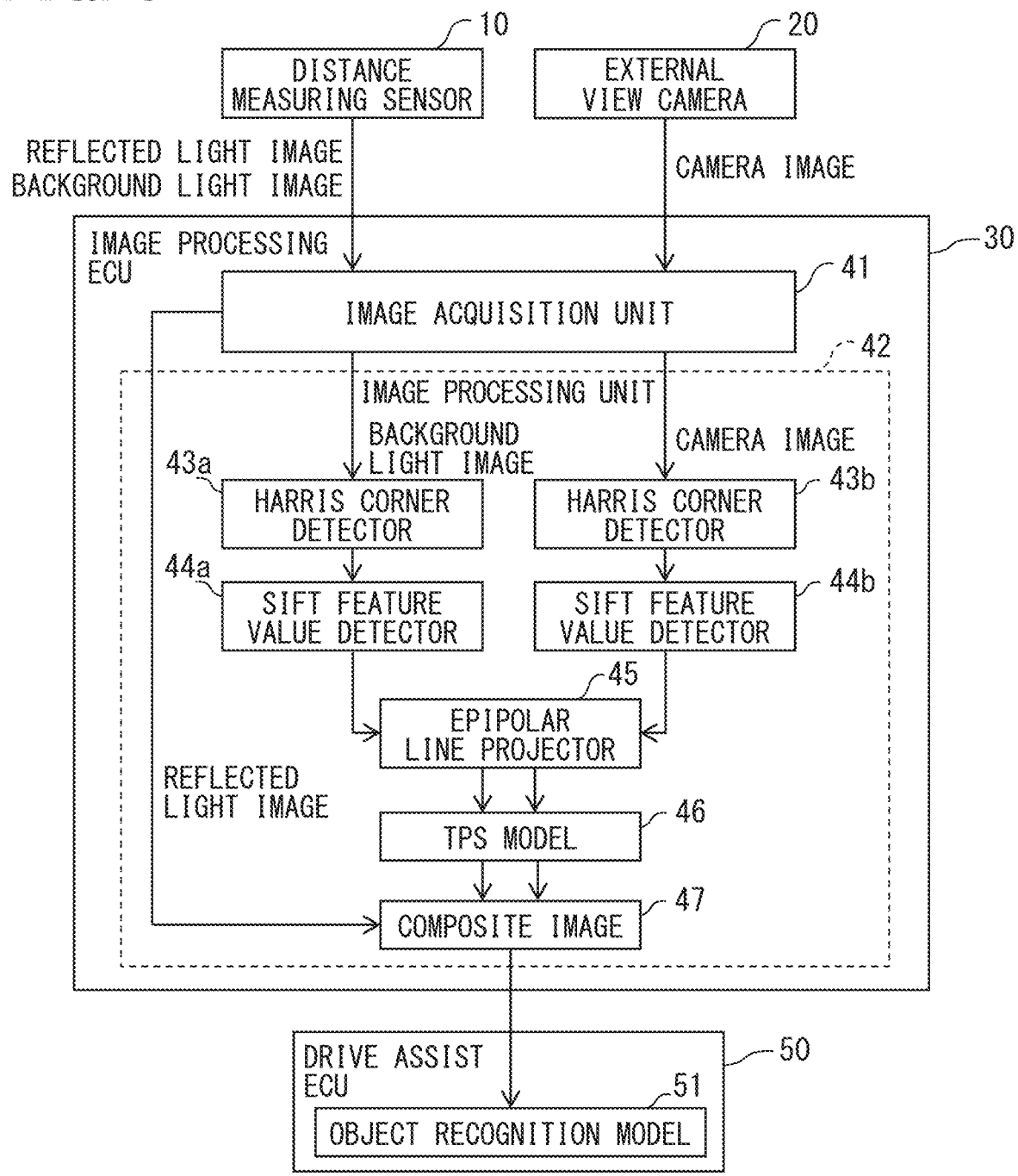
FIG. 3 is a diagram showing a configuration of an image processing ECU according to the first embodiment.

The image processing ECU 30 has multiple functional blocks for performing image registration, and these functional blocks are provided by the processor 31 executing an image registration program stored in the storage 33. As shown in FIG. 3, the image processing ECU 30 includes, as the functional blocks, an image acquisition unit 41 and an image processing unit 42.

The image acquisition unit 41 acquires the reflected light image and the background light image ImL from the distance measuring sensor 10, and acquires the camera image ImC from the external view camera 20. The image acquisition unit 41 successively provides the image processing unit 42 with a set of the latest reflected light image and the latest background light image ImL, and the latest camera image ImC.

By specifying the correspondence relationship between the feature point FPa of the background light image ImL and the feature point FPb of the camera image ImC, the image processing unit 42 performs the image registration between the reflected light image having the same coordinate system as that of the background light image ImL and the camera image ImC. In the present embodiment, the image processing unit 42 receives the sensor image in which three data channels including the intensity of the reflected light, the distance of the object, and the intensity of the background light are stored, and also receives the camera image ImC that is a high-resolution visible region color image. Thus, the image processing unit 42 can output, by image processing, a composite image including four data channels including the intensity of the reflected light, the distance to the object, the intensity of the background light, and the color information. In the present embodiment, the color information includes three data channels of red color intensity, green color intensity, and blue color intensity. Thus, the composite image substantially has information about six data channels including the intensity of the reflected light, the distance to the object, the intensity of the background light, the red color intensity, the green color intensity, and the blue color intensity.

The image processing unit 42 has a feature point detection function, a correspondence relationship specifying function, and a coordinate matching function. In the image registration, the feature point detection function corresponds to a first phase process, the correspondence relationship specifying function corresponds to a second phase process executed after the first phase process, and the coordinate matching function corresponds to a third phase process executed after the second phase process.

The feature point detection function is a function of respectively detecting the feature point FPa of the background light image ImL and the feature point FPb of the camera image ImC. For example, corner detection algorithm may be adopted for detecting the feature points FPa, FPb. For detecting the feature points FPa, FPb, various methods, for example, using a feature point detector may be used. In the present embodiment, Harris corner detection algorithm using Harris Corner Detector 43a, 43b is adopted as an example.

Each Harris corner detector 43a and 43b detects the feature point FPa, FPb based on eigenvalues of a tensor. Herein, sum of squares of the weighted difference of intensity corresponding to a movement of the pixel position within an evaluation target region is approximated using Taylor expansion, and is expressed by the structural tensor. Each Harris corner detector 43a and 43b determines whether the evaluation target regions is a corner (whether corresponding to the feature point FPa, FPb), an edge, or a flat region by evaluating the eigenvalues of the structural tensor and the determinant.

Figure 4A:
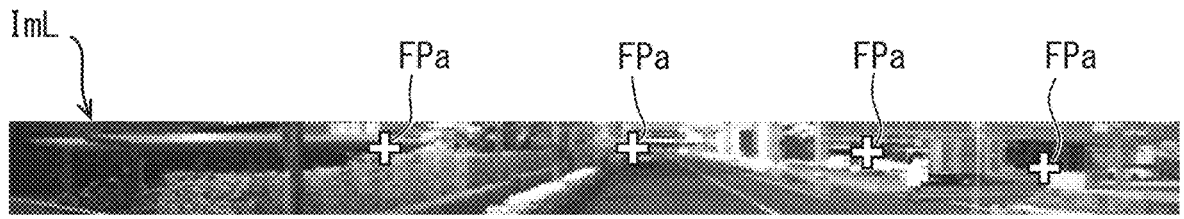
FIG. 4A is a diagram showing detection of feature points in a background light image according to the first embodiment.
Figure 4B:
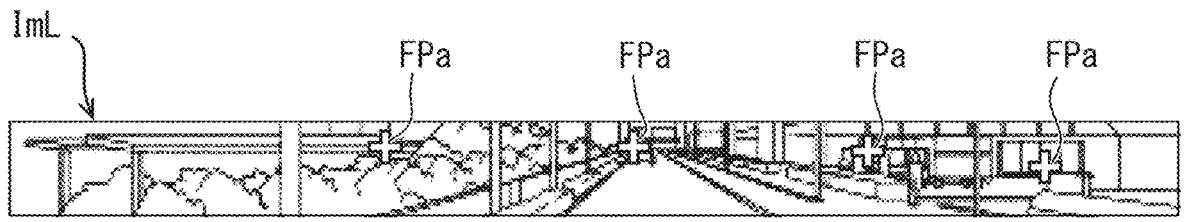
FIG. 4B is a diagram showing a line drawing of the background light image shown in FIG. 4A.
Figure 5A:
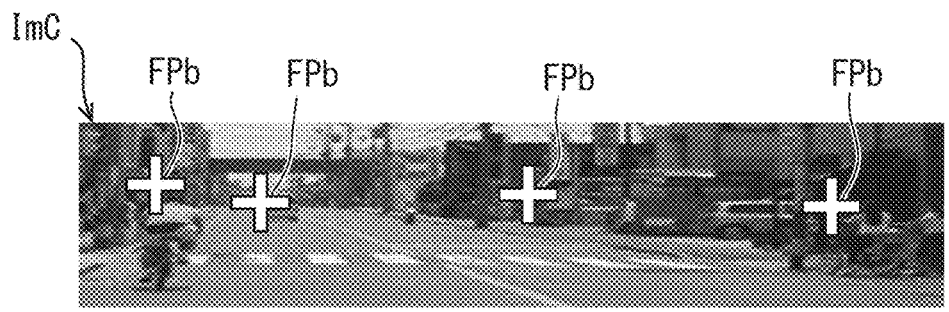
FIG. 5A is a diagram showing detection of feature points in a camera image according to the first embodiment.
Figure 5B:
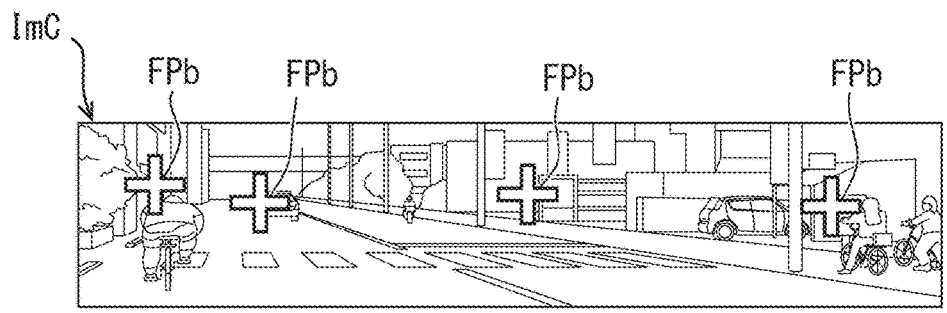
FIG. 5B is a diagram showing a line drawing of the camera image shown in FIG. 5A.

As shown in FIG. 4A and FIG. 4B, the Harris corner detector 43a detects multiple feature points FPa in the background light image ImL. As shown in FIG. 5A and FIG. 5B, the Harris corner detector 43b detects multiple feature points FPb in the camera image ImC. In FIG. 4A to FIG. 5B, the feature points FPa and FPb are schematically represented by cross marks. In practical application, more feature points FPa, FPb may be detected.

Each Harris corner detector 43a, 43b has one or more parameters (two in the present embodiment) that may affect a scale. That is, the parameter that may affect the scale is a parameter with low scale invariance. In the present embodiment, as a first example, the scale may be a size of the evaluation target region. As a second example, the scale may be a kernel size of the gradient detection filter, such as Sobel's gradient detection filter.

Since the resolution of the background light image ImL and the resolution of the camera image ImC are different, for the parameters affecting above-described scales, the Harris corner detector 43a, 43b usually detects different number of the feature points FPa in the background light image ImL from the number of the feature points FPb in the camera image ImC. In a case where an overlapping region exists between the measurement range MA1 of the distance measuring sensor 10 and the measurement range MA2 of the external view camera 20, for the overlapping region, the number of feature points FPa in the background light image ImL is not necessarily to be the same as the number of the feature points FPb in the camera image ImC.

In the present embodiment, the Harris corner detectors 43a is provided corresponding to the background light image ImL and the Harris corner detector 43b is provided corresponding to the camera image ImC as shown in FIG. 3. Alternatively, one common Harris corner detector may be provided to both of the background light image ImL and the camera image ImC using a common program. Alternatively, among the process executed by the Harris corner detectors 43a and 43b, only a portion of the process having high general purpose may be provided in common for the background light image ImL and the camera image ImC.

The correspondence relationship specifying function specifies the correspondence relationship between the feature point FPa of the background light image ImL and the feature point FPb of the camera image ImC. In the present embodiment, as described above, the number of detected feature points FPa in the background light image ImL is different from the number of detected feature points FPb in the camera image ImC. Further, the positional relationship of the feature points FPa in the background light image ImL may be different from the positional relationship of the feature points FPb in the camera image ImC. Further, the feature points FPa in the background light image ImL may have no correspondence relationship with the feature points FPb in the camera image ImC. Thus, there exists a difficulty in specifying the correspondence relationship.

As shown in FIG. 2, the light receiving element 12a of the distance measuring sensor 10 is disposed at a position different from a position of the camera element 22a of the external view camera 20 in the vehicle 1. In addition, a facing direction of the distance measuring sensor 10 may be different from a facing direction of the camera element 22a. As a result, the positional relationship of the feature points FPa in the background light image ImL is different from the positional relationship of the feature points FPb in the camera image ImC as described above.

When the above-described configuration is applied to the vehicle 1 moving at a high speed, the position of the captured object in the background light image ImL may be remarkably different from the position of the captured object in the camera image ImC due to the measurement time difference Δt. In some cases, the captured object may be included only in the background light image ImL or only in the background light image ImL. Therefore, a situation where the positional relationship of the feature points FPa in the background light image ImL is different from the positional relationship of the feature points FPb in the camera image ImC or a situation where the feature points FPa in the background light image ImL have no correspondence relationship with the feature points FPb in the camera image ImC may easily occur.

With consideration of the above-described difficulty in specifying the correspondence relationship, the image processing unit 42 specifies the correspondence relationship using a feature value obtained from a periphery region including the feature points FPa and FPb. In this case, feature value used for specifying the correspondence relationship is highly invariant with respect to the scale. Examples of the feature value that is highly invariant with respect to the scale include information related to an edge direction, an average value or a ratio of a certain physical quantity in the periphery region. In the present embodiment, as the feature value that is highly invariant with respect to the scale, information related to an extreme value with respect to a smoothing degree after a low-pass filter is applied to the periphery region is adopted.

For example, in the present embodiment, the image processing unit 42 may detect a feature value of Scale-Invariant Feature Transform (SIFT) using a SIFT feature value detector 44a, 44b, and specify the correspondence relationship based on the detected SIFT feature value. The feature value of SIFT is also referred to as SIFT feature value, and the SIFT feature value detector 44a, 44b correspond to a feature value detector in the present disclosure. Each feature value detector 44a, 44b applies a Gaussian filter as the above-mentioned low-pass filter to the periphery region including the feature points FPa, FPb detected by the corresponding Harris corner detector 43a, 43b.

Each feature value detector 44a, 44b changes a weighting coefficient σ corresponding to the standard deviation of the Gaussian filter, and searches for a local extremum in the periphery region. Each feature value detector 44a, 44b specifies at least a part of the weighting coefficient σ in which the local extremum is found as promising σ by excluding edges, and sets the promising σ as the SIFT feature that is highly invariant with respect to the scale.

The SIFT feature value corresponding to each feature point FPa of the background light image ImL is compared with the SIFT feature value corresponding to each feature point FPb of the camera image ImC. Thus, the matching accuracy between the feature point FPa in the background light image and the feature point FPb in the camera image can be improved.

In the present embodiment, the feature value detector 44a is provided corresponding to the background light image ImL and the feature value detector 44b is provided corresponding to the camera image ImC as shown in FIG. 3. Alternatively, one common feature value detector may be provided to both of the background light image ImL and the camera image ImC using a common program. Alternatively, among the process executed by the feature value detectors 44a and 44b, only a portion of the process having high general purpose may be provided in common for the background light image ImL and the camera image ImC.

Figure 6A:
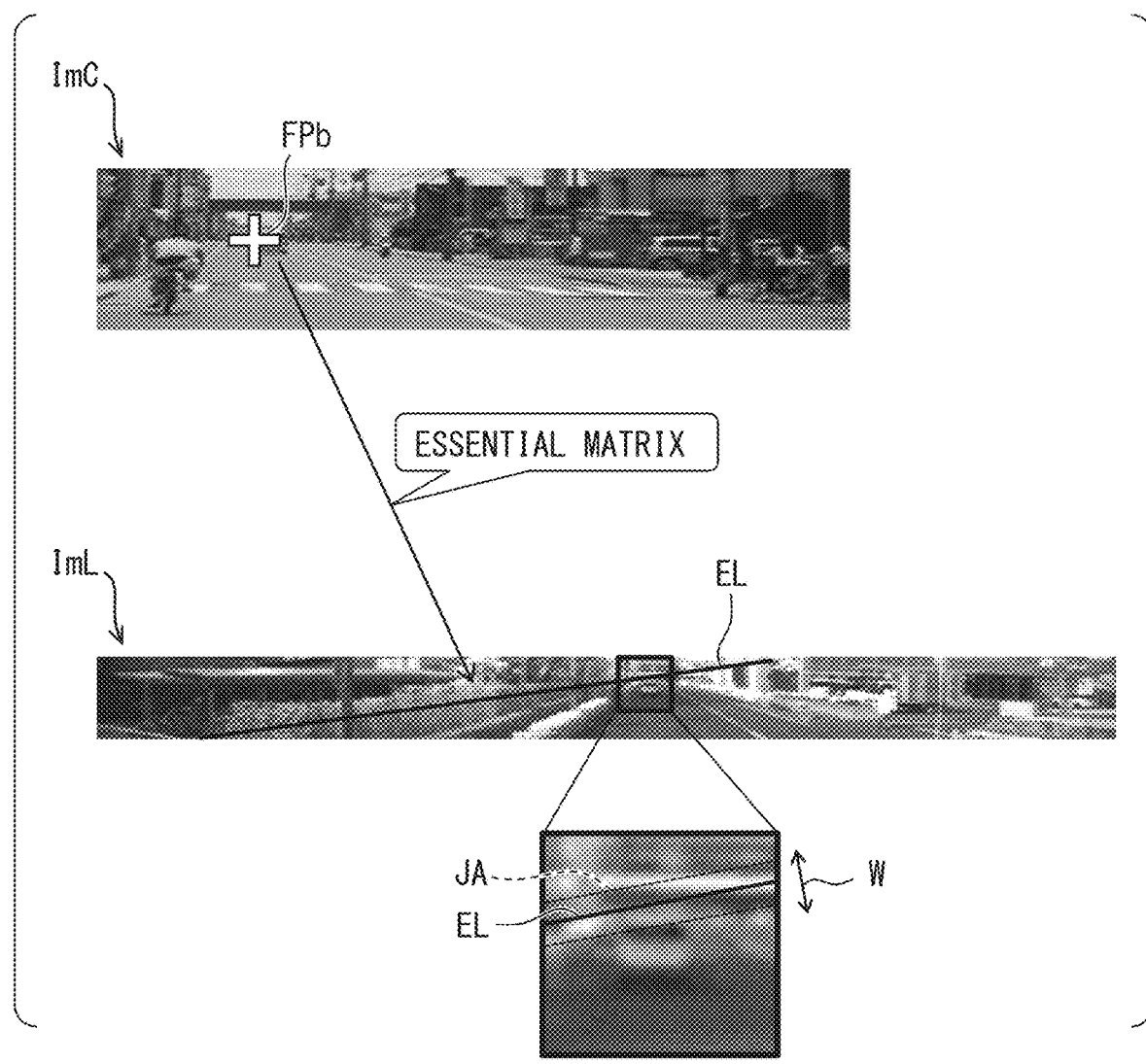
FIG. 6A is a diagram showing a specification of correspondence between the feature point in the background light image and the feature point in the camera image according to the first embodiment.
Figure 6B:
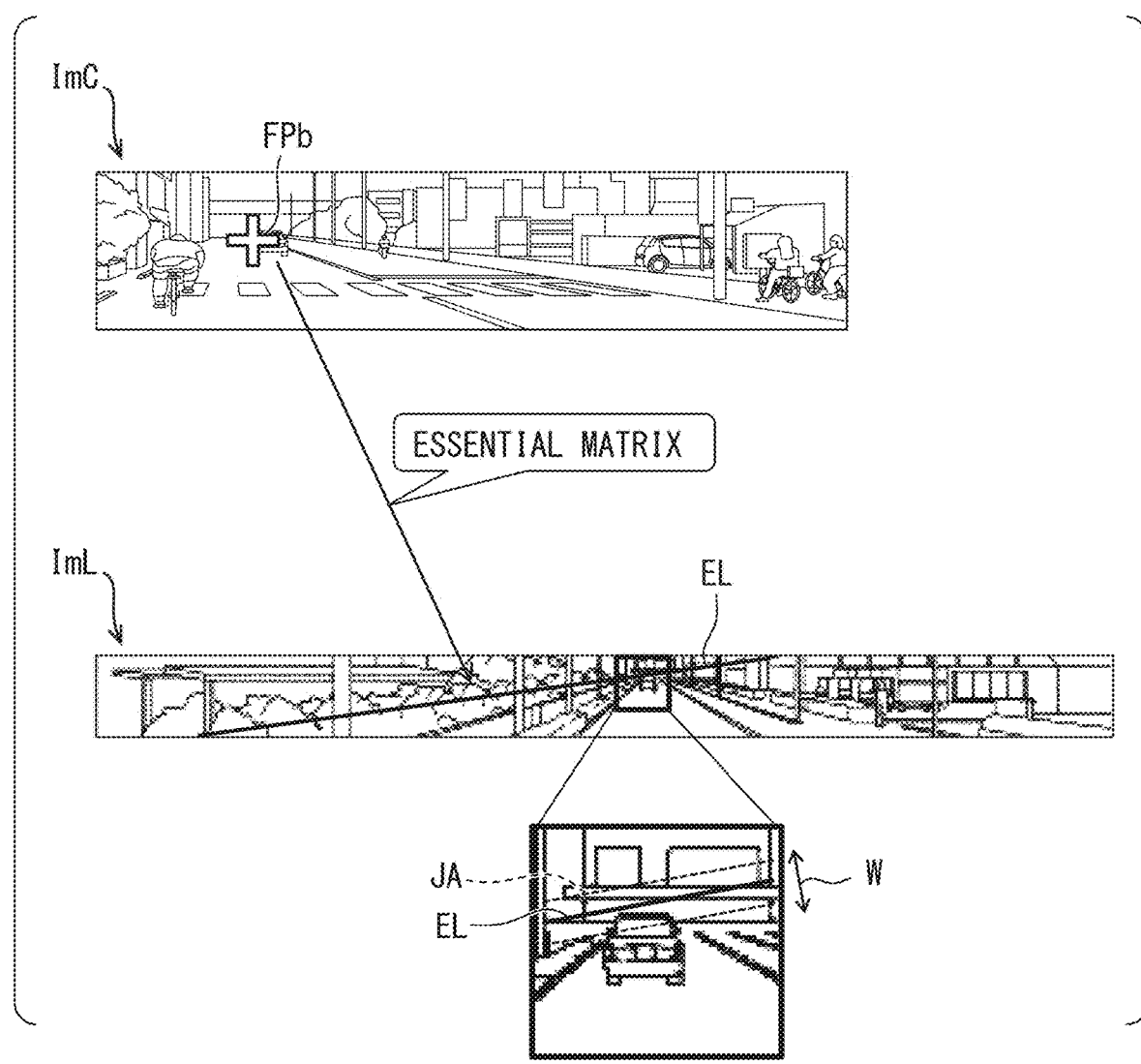
FIG. 6B is a diagram showing a line drawing of the camera image and the background light image shown in FIG. 6A.

After above-described process, the image processing unit 42 specifies the correspondence relationship in consideration of the difference between positions of the feature points in the background light image and the positions of the feature points in the camera image caused by a relative position relationship between the distance measuring sensor 10 and the external view camera 20. Based on Epipolar Geometry, as shown in FIG. 6A and FIG. 6B, the image processing unit 42 uses an epipolar line projector 45 to obtain an epipolar line EL corresponding to the feature points FPb in the camera image ImC, and projects the obtained epipolar line EL in the background light image ImL. The epipolar line EL is a line where an epipolar plane intersects with the image plane. The epipolar plane is a plane that passes through an optical center of the distance measuring sensor 10, an optical center of the external view camera 20, and a three-dimensional point of the object corresponding to the feature point FPb in the camera image ImC.

The epipolar line projector 45 stores an E matrix (essential matrix) defined based on a position of the light receiving element 12a and a position of the camera element 22a. The E matrix is a matrix for mapping a point in the camera image ImC to a line (that is, the epipolar line EL) in the background light image ImL.

When the background light image ImL is synchronized with the camera image ImC, the feature point FPa in the background light image ImL and the corresponding feature point FPb in the camera image ImC are positioned on the epipolar line EL obtained by the epipolar line projector 45. In the present embodiment, as described above, the measurement time difference Δt exists between the background light image ImL and the camera image ImC. The object included in both of the background light image ImL and the camera image ImC may move during the measurement time difference Δt.

With consideration of the movement of object, the image processing unit 42 narrows down the feature point FPa having the correspondence relationship by setting a determination region JA which is a band-shaped region centered on the epipolar line EL and has a predetermined allowable width W. The allowable width W is set according to a difference value assumed between the measurement time of the background light image ImL and the measurement time of the camera image ImC. Specifically, the image processing unit 42 narrows down, using the feature points FPa in the background light image ImL located inside the determination region JA, candidates for a point corresponding to the feature point FPb in the camera image ImC which is the projection source image of the epipolar line EL. Then, among the narrowed down feature points FPa, the feature point FPa which has the closest SIFT feature value is determined as the feature point FPa corresponding to the feature point FPb in the camera image ImC. In this way, the image processing unit 42 specifies the one-to-one individual correspondence relationship between each feature point FPb in the camera image ImC and each feature point FPa in the background light image ImL. When the number of feature points FPa in the background light image ImL detected by the Harris corner detector 43a is different from the number of feature points FPb in the camera image ImC detected by the Harris corner detector 43b, some feature points FPa in the background light image may have no correspondence relationship with the feature points FPb in the camera image. Such feature points FPa, FPb are not used for the image registration, and are excluded in the subsequent process.

Figure 7:
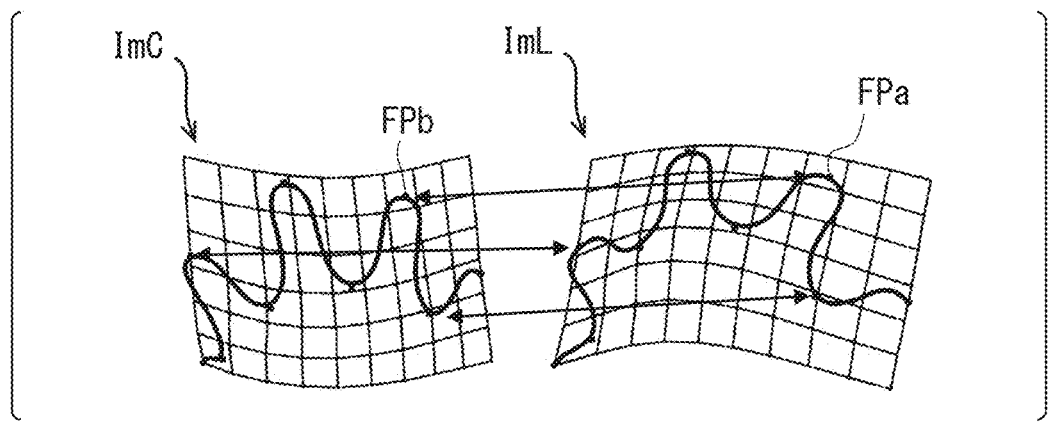
FIG. 7 is a diagram showing a coordinate matching according to the first embodiment.

The coordinate matching function is a function of correlating each pixel of the background light image ImL with each pixel of the camera image ImC based on the specification result of the correspondence relationship between the feature points FPa in the background light image and the feature points FPb in the camera image. As shown in FIG. 7, the image processing unit 42 specifies a correspondence relationship between the coordinate system of the background light image ImL and the coordinate system of the camera image ImC by non-linearly and smoothly distorting at least one of the background light image ImL or the camera image ImC based on the positional relationship between the feature point FPa in the background light image and the corresponding feature point FPb in the camera image.

The image processing unit 42 performs thin plate spline (TPS) using, for example, a TPS model in matching of the coordinates. In the TPS model, TPS is performed by using the coordinates of the corresponding feature points FPa and FPb as covariates. The TPS model specifies the correspondence relationship between each pixel in the background light image ImL and each pixel in the camera image ImC. Herein, the pixel is a pixel that does not correspond to the feature point FPa, FPb.

As a specific example for explaining the specifying the correspondence relationship between each pixel in the background light image and each pixel in the camera image, it is supposed that the measurement time of the background light image ImL is later than the measurement time of the camera image ImC by time difference Δt and a front vehicle existing in front of the vehicle 1 moves during the time difference Δt in a manner that a distance therebetween is increased. In this case, a ratio of a distance between the feature points indicating the front vehicle to a distance between the feature points indicating the landscape in the background light image ImL is smaller than a distance between the feature points indicating the front vehicle to a distance between the feature points indicating the landscape in the camera image ImC. Thus, by non-linearly distorting the background light image ImL so that the area indicating the front vehicle is enlarged with respect to the area indicating the landscape in the background light image ImL, the coordinate system of the background light image ImL can be matched with the coordinate system of the image ImC.

The process executed in the coordinate matching function corrects the measurement time difference Δt, thereby treating the background light image ImL and the camera image ImC in the same manner as synchronized data with one another. As described above, the background light image ImL can be regarded as having the same coordinate system, and is synchronized with the reflected light image. As a result, the image processing unit 42 can treat the reflected light image, which includes the distance information, and the camera image ImC, which is a high-resolution and color image, in the same manner as the synchronized data with one another. In the image registration of such reflected light image and the camera image ImC, the background light image ImL functions like an adhesive for associating the reflected light image with the camera image.

The image processing unit 42 outputs the composite image which is the above-mentioned integrated image data by converting the coordinates corresponding to each pixel in the background light image ImL into the coordinates corresponding to each pixel in the camera image ImC. Since the composite image has one common coordinate system for each data channel, the processing of the application program (hereinafter referred to as application) using the composite image is simplified thereby reducing the calculation processing load and improving the processing accuracy of the application.

In the present embodiment, the composite image output by the image processing unit 42 is provided to the driving assist ECU 50 as the peripheral monitoring image information. In order to recognize the surrounding environment of the vehicle 1, the driving assist ECU 50, specifically, the processor of the driving assist ECU 50 executes an application program for recognizing an object using the composite image. The application program for recognizing the object is also referred to as an object recognition program.

In the present embodiment, the object recognition using semantic segmentation is performed as the objection recognition program. The storage of the driving assist ECU 50 includes an object recognition model 51, and the object recognition model mainly includes a neural network as one component of the object recognition program. The neural network may include a structure known as SegNet in which an encoder is combined with a decoder.

Figure 8:
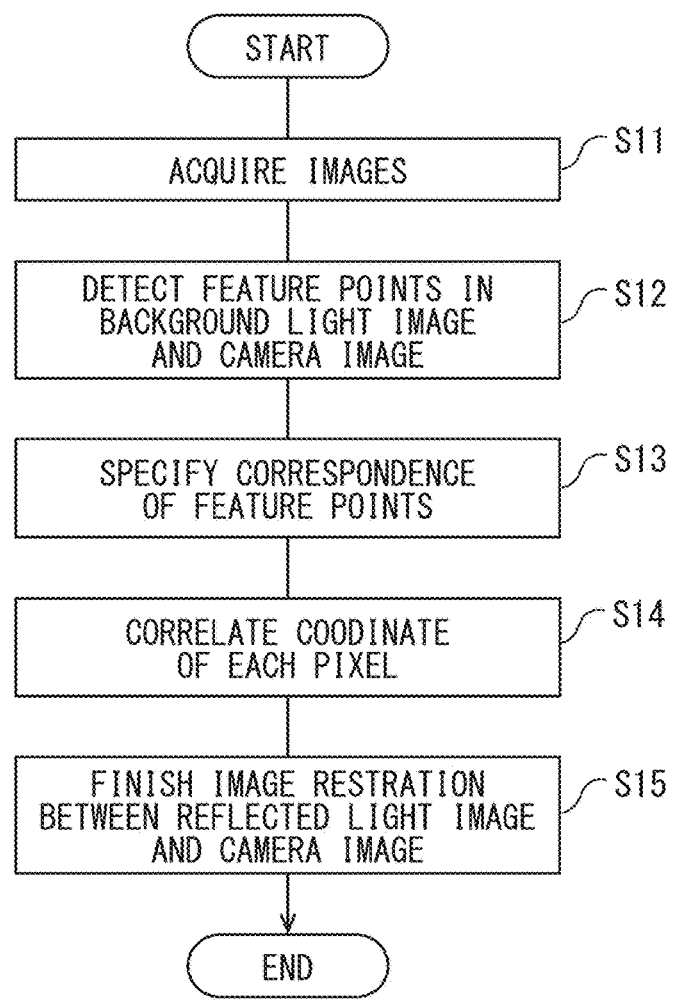
FIG. 8 is a flowchart showing a process executed by the image processing ECU according to the first embodiment.

The following will describe details of the image registration method for performing image registration between the reflected light image and the camera image ImC based on the image registration program with reference to the flowchart shown in FIG. 8. The image processing based on each step of the flowchart is performed, for example, at predetermined time intervals or every time the distance measuring sensor 10 or the external view camera 20 generates a new image.

First, in S11, the image acquisition unit 41 acquires the latest reflected light image and background light image ImL from the distance measuring sensor 10, and acquires the latest camera image ImC from the external view camera 20. The image acquisition unit 41 provides acquired images to the image processing unit 42. After the process in S11, the process proceeds to S12.

In S12, the image processing unit 42 detects the feature points FPa in the background light image ImL and the feature points FPb in the camera image ImC, respectively. After the process in S12, the process proceeds to S13.

In S13, the image processing unit 42 specifies the correspondence relationship between the feature points FPa in the background light image ImL detected in S12 and the feature points FPb in the camera image ImC detected in S12. After the process in S13, the process proceeds to S14.

In S14, the image processing unit 42 performs the coordinate matching by specifying the correspondence relationship between each pixel in the background light image ImL and each pixel in the camera image ImC based on the positional relationship between the feature points FPa in the background light image and the corresponding feature points FPb in the camera image, for which the correspondence relationship is defined in S13. Herein, the pixel is a pixel that does not correspond to the feature points FPa, FPb. After the process in S14, the process proceeds to S15.

In S15, the image processing unit 42 converts the coordinate system of the background light image ImL and the reflected light image into the coordinate system of the camera image ImC, or vice versa, so that the reflected light image is combined with the camera image ImC. Then, the image registration of the reflected light image and the camera image is finished. After S15, the process is ended.

(Operation Effects)

Operation effects of the first embodiment will be described below.

According to the image processing ECU 30 of the first embodiment, the image registration between the acquired reflected light image and the camera image ImC is performed using the background light image ImL having the same coordinate system as that of the reflected light image. The background light image ImL has characteristic closer to that of the camera image ImC compared with the reflected light image. By comparing the feature points FPa in the background light image with the feature points FPb in the camera image ImC, it becomes easy to specify the correspondence relationship between the feature points FPa in the background light image and the feature points FPb in the camera image ImC. By such correlation, the coordinate system of the reflected light image can be accurately matched with the coordinate system of the camera image ImC. Thus, a processing accuracy of the application using both of the reflected light image and the camera image ImC can be remarkably improved.

In the first embodiment, in the image registration, the feature points FPa in the background light image ImL and the feature points FPb in the camera image ImC are detected, respectively. Then, the correspondence relationship between the detected feature points FPa in the background light image ImL and the feature points FPb in the camera image ImC is specified. After that, each pixel of the background light image ImL is correlated with corresponding pixel of the camera image ImC based on the specified result of the correspondence relationship. After specifying the correspondence relationship between the feature points FPa of the background light image and the feature points FPb of the camera image, the coordinate of each pixel in the background light image is correlated with corresponding pixel in the camera image based on the specified correspondence relationship. Thus, highly accurate image registration can be executed with reduced processing load and increased processing speed compared with a case where the correspondence relationship of each pixel is specified with other methods, such as full scanning.

In the first embodiment, the image processing unit considers, in the specifying of the correspondence relationship, the difference between the feature point positions in the background light image and the corresponding feature point positions in the camera image, which is caused by the position difference between the distance measuring sensor 10 and the external view camera 20. By this configuration, it is possible to improve the accuracy of specifying the correspondence relationship of the feature points FPa and FPb.

In the first embodiment, in the specifying of the correspondence relationship, the epipolar line EL corresponding to the feature points FPb in the projection source image among the background light image ImL and the camera image ImC is projected on a projection destination image. Then, the feature point FPa of the projection destination image located in the band-shaped determination region JA, which has the predetermined allowable width W along the epipolar line EL, is determined as the corresponding feature point of the feature point FPb in the projection source image. By determining the allowable width W, it is possible to absorb errors such as projection errors between the background light image ImL and the camera image ImC when specifying the correspondence relationship between the feature points FPa in the background light image and the feature points FPb in the camera image ImC. Thus, specifying accuracy of the correspondence relationship can be improved.

In the first embodiment, the allowable width W is set according to the difference value assumed between the measurement time of the background light image ImL and the measurement time of the camera image ImC. During the measurement time difference Δt, suppose that an object, which is included in both of the background light image ImL and the camera image ImC and corresponds to the feature points FPa, FPb, moves. In this case, when the feature points FPa corresponding to the object are located within the determination region JA having the allowable width W set according to the measurement time difference, the feature points FPa and the corresponding feature points FPb are specified. Therefore, it is possible to improve the specifying accuracy of the correspondence relationship.

In the first embodiment, when specifying the correspondence relationship between the feature points FPa in the background light image ImL and the feature points FPb in the camera image ImC, the SIFT feature value is used as the feature value, which is obtained from the peripheral region including the feature points FPa and FPb and has a highly invariant characteristic relative to the scale. There is a difference between a detection level (detection sensitivity) of the feature points FPa in the background light image ImL and a detection level of the feature points FPb in the camera image having a higher resolution than the background light image ImL. By using the SIFT feature value that is highly invariant relative to the scale, even the detection level difference exists between the background light image and the camera image, an erroneous determination of the correspondence relationship can be suppressed. Therefore, it is possible to improve the specifying accuracy of the correspondence relationship.

According to the image generation system 100 of the first embodiment, the image registration between the reflected light image and the camera image ImC is performed using the background light image ImL having the same coordinate system as that of the reflected light image. The background light image ImL has characteristic closer to that of the camera image ImC compared with the reflected light image. By comparing the feature points FPa in the background light image with the feature points FPb in the camera image ImC, it becomes easy to specify the correspondence relationship between the feature points FPa in the background light image and the feature points FPb in the camera image ImC. By such correlation, the coordinate system of the reflected light image can be accurately matched with the coordinate system of the camera image ImC. Then, the distance information provided by the distance measuring sensor 10 and the information of camera image ImC provided by the external view camera 20, which are information provided by different image generation sources, can be provided in a form of composite image that can be easily processed by the application. Thus, a processing accuracy of the application using both of the reflected light image and the camera image ImC can be remarkably improved.

In the image registration method according to the first embodiment, the feature points FPa in the prepared background light image ImL and the feature points FPb in the camera image ImC are detected, respectively. Then, the correspondence relationship between the detected feature points FPa in the background light image ImL and the feature points FPb in the camera image ImC is specified. After that, each pixel of the background light image ImL is correlated with corresponding pixel of the camera image ImC based on the specified result of the correspondence relationship. As described above, the image registration between the reflected light image and the camera image ImC is performed using the background light image ImL. The background light image ImL has the same coordinate system as that of the reflected light image, and has characteristic closer to that of the camera image ImC compared with the reflected light image. Thus, it becomes easy to specify the correspondence relationship between the feature points FPa of the background light image and the feature points FPb of the camera image ImC. By such correlation, the coordinate system of the reflected light image can be accurately matched with the coordinate system of the camera image ImC. Thus, a processing accuracy of the application using both of the reflected light image and the camera image ImC can be remarkably improved. After specifying the correspondence relationship between the feature points FPa of the background light image and the feature points FPb of the camera image, the coordinate of each pixel in the background light image is correlated with corresponding pixel in the camera image based on the specified correspondence relationship. Thus, highly accurate image registration can be executed with reduced processing load and increased processing speed compared with a case where the correspondence relationship of each pixel is specified with other methods, such as full scanning.

In the image registrant program product according to the first embodiment, the feature points FPa in the acquired background light image ImL and the feature points FPb in the camera image ImC are detected, respectively. Then, the correspondence relationship between the detected feature points FPa in the background light image ImL and the feature points FPb in the camera image ImC is specified. After that, each pixel of the background light image ImL is correlated with corresponding pixel of the camera image ImC based on the specified result of the correspondence relationship. As described above, the image registration between the reflected light image and the camera image ImC is performed using the background light image ImL. The background light image ImL has the same coordinate system as that of the reflected light image, and has characteristic closer to that of the camera image ImC compared with the reflected light image. Thus, it becomes easy to specify the correspondence relationship between the feature points FPa of the background light image and the feature points FPb of the camera image ImC. By such correlation, the coordinate system of the reflected light image can be accurately matched with the coordinate system of the camera image ImC. Thus, a processing accuracy of the application using both of the reflected light image and the camera image ImC can be remarkably improved. After specifying the correspondence relationship between the feature points FPa of the background light image and the feature points FPb of the camera image, the coordinate of each pixel in the background light image is correlated with corresponding pixel in the camera image based on the specified correspondence relationship. Thus, highly accurate image registration can be executed with reduced processing load and increased processing speed compared with a case where the correspondence relationship of each pixel is specified with other methods, such as full scanning.

Second Embodiment

Figure 9:
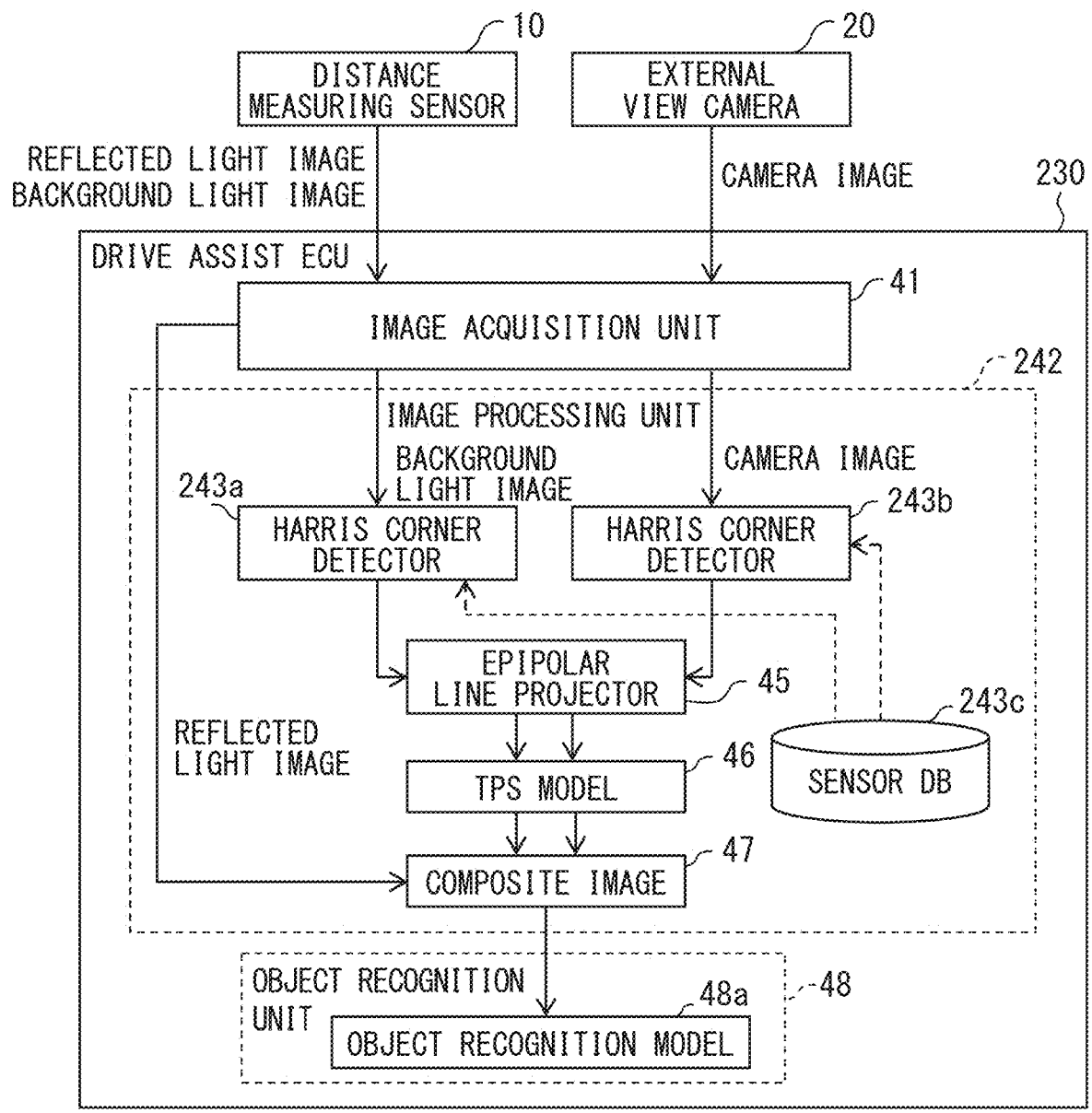
FIG. 9 is a diagram showing a configuration of an image processing ECU according to a second embodiment of the present disclosure.

A second embodiment shown in FIG. 9 is a modification of the first embodiment. The second embodiment will be described focusing on differences from the first embodiment.

In the second embodiment, the functions of the image processing ECU 30 and the driving assist ECU 50 described in the first embodiment are integrated into a single ECU as a driving assist ECU 230. In the second embodiment, the driving assist ECU 230 corresponds to the image registration apparatus. In the driving assist ECU 230 according to the second embodiment, the image registration function constitutes a part of the highly accurate peripheral recognition function. Thus, the driving assist ECU 230 also corresponds to a peripheral environment recognition apparatus that recognizes the peripheral environment of the vehicle 1. The driving assist ECU 230 includes a processor 31, a RAM 32, a storage 33, an input/output interface 34, similar to the image processing ECU 30 of the first embodiment.

Similar to the image processing ECU 30 of the first embodiment, the driving assist ECU 230 of the second embodiment has multiple functional blocks provided by an execution of the image registration program and the object recognition program stored in the storage 33 by the processor 31. Specifically, as shown in FIG. 9, the driving assist ECU 230 includes, as functions blocks, an image acquisition unit 41, an image processing unit 242, and an object recognition unit 48.

The image acquisition unit 41 is the same as that of the first embodiment. The object recognition unit 48 uses the same object recognition model 48a as in the first embodiment to perform object recognition using semantic segmentation.

The image processing unit 242 of the second embodiment has a feature point detection function, a correspondence relationship specifying function, and a coordinate matching function, similar to the image processing unit 42 of the first embodiment. However, in the feature point detection function, the image processing unit 242 considers a ratio of the resolution of the background light image ImL to the resolution of the camera image ImC. Hereinafter, this ratio is also referred to as a resolution ratio. Further, the image processing unit 242 does not use the SIFT feature value in the correspondence relationship specifying function different from the first embodiment.

Specifically, the storage 33 of the driving assist ECU 230 includes a sensor system database 243c (hereinafter referred to as a sensor system DB). The sensor system DB 243c stores information on various sensors and cameras mounted on the vehicle 1. The information includes specification information of the light receiving element 12a of the distance measuring sensor 10 and specification information of the camera element 22a of the external view camera 20. The specification information of the light receiving element 12a of the distance measuring sensor 10 includes resolution information of the light receiving element 12a. The specification information of the camera element 22a of the external view camera 20 includes resolution information of the camera element 22a. Based on these resolution information, the image processing unit 242 can specify the resolution ratio.

The Harris corner detector 243a of the second embodiment sets, based on the resolution ratio, a scale parameter used for detecting the feature points FPa in the background light image ImL to be different from a scale parameter for detecting the feature points FPb in the camera image ImC. Specifically, in the feature point detection of the camera image ImC, which has a higher resolution than that of the background light image ImL, at least one of the size of the evaluation target region set as the scale parameter or the kernel size of the gradient detection filter set as the scale parameter may set less than corresponding scale parameter of the background light image ImL. With this configuration, the detection level of the feature points FPa in the background light image ImL can be adjusted to be close to the detection level of the feature points FPb in the camera image ImC.

As a result, in the correspondence relationship specifying function, it becomes easy to specify the correspondence relationship between the detected feature points FPa in the background light image ImL and the feature points FPb in the camera image ImC without using the SIFT feature value. In other words, the correspondence relationship can be specified with high accuracy.

According to the second embodiment described above, each of the Harris corner detectors 243a and 243b includes the scale parameter that affects the scale. The Harris corner detectors 243a functions as the feature point detector for detecting the feature points FPa in the background light image ImL, and the Harris corner detector 243b functions as the feature point detector for detecting the feature points FPb in the camera image ImC. In the above configuration, the scale parameter used to detect the feature points FPa in the background light image ImL is set to be different from the scale parameter used to detect the feature points FPb in the camera image ImC, based on the ratio of resolution of the background light image ImL to the resolution of the camera image ImC. Thus, even when the resolution of the camera image ImC is higher than the resolution of the background light image ImL, the detection level of the feature points FPa in the background light image ImL can be adjusted to be close to the detection level of the feature points FPb in the camera image ImC. Since the detection level of the feature points FPa is close to the detection level of the feature points FPb, by comparing the feature points FPa with the feature points FPb, the specifying accuracy of correspondence relationship can be improved.

Other Embodiments

Although multiple embodiments have been described above, the present disclosure is not construed as being limited to those embodiments, and can be applied to various embodiments and combinations within a scope that does not depart from the spirit of the present disclosure.

As a first modification, the distance measuring sensor 10 and the external view camera 20 may be configured as an integrated sensor unit. Further, an image registration apparatus, such as the image processing ECU 30 of the first embodiment may be included as a component of the integrated sensor unit.

As a second modification, which is a modification of the first embodiment, the image processing ECU 30 may include an object recognition unit 48 as the second embodiment, and recognize the peripheral environment of the vehicle 1. The image processing ECU 30 recognizes the peripheral environment of the vehicle 1, and the analyzed information of the recognition result may be provided to the driving assist ECU 50 having the driving assist function.

As a third modification, the image processing unit 42 does not have to integrate the reflected light image, the background light image ImL, and the camera image ImC into a multi-channel composite image and output the generated composite image. The image processing unit 42 may output, as separate image data channels, the reflected light image, the background light image ImL, and the camera image ImC. In addition to these image data channels, the image processing unit 42 may output coordinate correspondence data indicating the correspondence relationship of the coordinate systems of the above-described multiple images.

As a fourth modification, the image processing unit 42 may output the reflected light image and the camera image ImC to which the image registration is carried out, and may not output the background light image ImL.

As a fifth modification, the camera image ImC may be a grayscale image instead of the color image described in the first embodiment.

As a sixth modification, in the object recognition using the reflected light image and the camera image ImC to which the image registration is carried out, the object recognition using semantic segmentation is not necessarily carried out. For example, the object recognition may be carried using a bounding box method.

As a seventh modification, the reflected light image and the camera image ImC to which the image registration is carried out may be used in a different application of the vehicle 1 other than the object recognition application. For example, the distance measuring sensor 10 and the camera 20 may be installed in a conference room, and the reflected light image and the camera image ImC to which the image registration is carried out may be used in a communication application of video conference.

As an eighth modification, orientation information for imparting rotational invariance may be added to the detected SIFT feature value. The orientation information is useful, for example, in a situation where an inclination of the installation surface of the distance measuring sensor 10 is different from an inclination of the installation surface of the camera 20.

As a ninth modification, when the epipolar line EL corresponding to the feature points FPb in the camera image ImC is projected on the background light image ImL or when the epipolar line EL corresponding to the feature points FPa in the background light image ImL is projected on the camera image ImC, F matrix (Fundamental matrix) may be used instead of the E matrix. The F matrix is useful in a situation where calibrations are not carried out to distance measuring sensor 10 and the camera 20.

As a tenth modification, the image processing unit 42 may perform the image registration to an image generated by, for example, a millimeter wave radar in addition to the image generated by the distance measuring sensor 10 and the image generated by the camera 20.

As an eleventh modification, the respective functions provided by the image processing ECU 30 can be also provided by software and hardware for executing the software, only software, only hardware, and complex combinations of software and hardware. In cases where functions are provided by electronic circuits as hardware, the functions can be also provided by analog circuits or digital circuits which include a large number of logic circuits.

As a twelfth modification, the form of the storage medium for storing the image registration program or the like that can realize the above image registration method may be changed as appropriate. For example, the storage medium is not limited to the configuration provided on the circuit board, and may be provided in the form of a memory card or the like. The storage medium may be inserted into a slot portion, and electrically connected to the control circuit of the image processing ECU 30. Further, the storage medium may be an optical disk or a hard disk as a copy base of the program of the image processing ECU 30.

The processing unit and the method thereof which have been described in the present disclosure may be also implemented by a special purpose computer which includes a processor programmed to execute one or more functions implemented by computer programs. Alternatively, the apparatus and the method described in the present disclosure may be implemented by a special purpose hardware logic circuit. Alternatively, the apparatus and the method described in the present disclosure may be implemented by one or more special purpose computers configured by a combination of a processor executing a computer program and one or more hardware logic circuits. Further, the computer program may be stored in a computer-readable non-transitory tangible storage medium as instructions executed by a computer.

What is claimed is:

1. An image registration apparatus communicably connected with a distance measuring sensor and a camera, the distance measuring sensor being provided by a light detection and ranging (LiDAR) sensor generating a reflected light image, which includes distance information, by emitting light toward an object and sensing, with a light receiving element, reflected light from the object, the LiDAR sensor generating a background light image, which has a same coordinate system as a coordinate system of the reflected light image, by sensing, with the light receiving element, background light with respect to the reflected light, the camera generating a camera image by sensing incident light with a camera element, the camera image having a resolution higher than a resolution of the reflected light image and a resolution of the background light image, the image registration apparatus comprising:

an image acquisition unit acquiring the reflected light image, the background light image, and the camera image; and an image processing unit executing an image registration to the reflected light image, which has the same coordinate system as the coordinate system of the background light image, and the camera image by specifying a correspondence relationship between a feature point in the background light image and a feature point in the camera image, wherein one of the background light image and the camera image is defined as a projection source image and the other one of the background light image and the camera image is defined as a projection destination image, and the image processing unit:

projects, on the projection destination image, an epipolar line corresponding to the feature point of the projection source image; and determines the feature point of the projection destination image positioned within a determination region of the epipolar line as a target feature point that has the correspondence relationship with the feature point of the projection source image, wherein the determination region of the epipolar line is set to have a band shape along the epipolar line with a predetermined allowable width.

2. The image registration apparatus according to claim 1, wherein the image processing unit:

detects the feature point in the background light image and the feature point in the camera image, respectively;

specifies the correspondence relationship between the feature point in the background light image and the feature point in the camera image; and correlates, based on the specified correspondence relationship, each pixel in the background light image with a corresponding pixel in the camera image.

3. The image registration apparatus according to claim 2, wherein the image processing unit specifies the correspondence relationship with consideration of a position difference between a position of the feature point in the background light image and a position of the feature point in the camera image, and the position difference is caused by a relative positional relationship between the distance measuring sensor and the camera.

4. The image registration apparatus according to claim 1, wherein the predetermined allowable width of the epipolar line is set according to a measurement time difference between a measurement time of the background light image and a measurement time of the camera image.

5. The image registration apparatus according to claim 2, wherein the image processing unit:

specifies the correspondence relationship between a plurality of the feature points in the background light image and a plurality of the feature points in the camera image, acquires a feature value of the background light image and acquires a feature value of the camera image, each of the feature values having a highly invariant characteristic relative to an image scale and being obtained from a peripheral region including the plurality of the feature points in the corresponding image; and specifies the correspondence relationship using the feature value of the background light image and the feature value of the camera image.

6. The image registration apparatus according to claim 2, wherein the image processing unit:

detects the feature point in the background light image using a first feature point detector, the first feature point detector having a first scale parameter that affects an image scale of the background light image;

detects the feature point in the camera image using a second feature point detector, the second feature point detector having a second scale parameter that affects an image scale of the camera image;

calculates a resolution ratio of the resolution of the background light image to the resolution of the camera image; and sets, based on the resolution ratio, the first scale parameter used to detect the feature point in the background light image to be different from the second scale parameter used to detect the feature point in the camera image.

7. An image generation system generating an image to be used in an application program, the image generation system comprising:
- a distance measuring sensor being provided by a light detection and ranging (LiDAR) sensor generating a reflected light image, which includes distance information, by emitting light toward an object and sensing, with a light receiving element, reflected light from the object, the LiDAR sensor further generating a background light image, which has a same coordinate system as a coordinate system of the reflected light image, by sensing, with the light receiving element, background light with respect to the reflected light;
- a camera generating a camera image by sensing incident light with a camera element, the camera image having a resolution higher than a resolution of the reflected light image and a resolution of the background light image; and
- an image registration apparatus including an image processing unit, the image processing unit generating a composite image in which the distance information of the reflected light image is combined with the camera image by executing an image registration to the reflected light image, which has the same coordinate system as the coordinate system of the background light image, and the camera image, the image processing unit specifying a correspondence relationship between a feature point in the background light image and a feature point in the camera image as the image registration, wherein
one of the background light image and the camera image is defined as a projection source image and the other one of the background light image and the camera image is defined as a projection destination image, and the image processing unit:
- projects, on the projection destination image, an epipolar line corresponding to the feature point of the projection source image; and
- determines the feature point of the projection destination image positioned within a determination region of the epipolar line as a target feature point that has the correspondence relationship with the feature point of the projection source image,
wherein the determination region of the epipolar line is set to have a band shape along the epipolar line with a predetermined allowable width.

8. An image generation method comprising:
preparing, using a distance measuring sensor that is provided by a light detection and ranging (LiDAR) sensor, a reflected light image and a background light image, the LiDAR sensor generating the reflected light image, which includes distance information, by emitting light toward an object and sensing, with a light receiving element, reflected light from the object, the LiDAR sensor further generating the background light image, which has a same coordinate system as a coordinate system of the reflected light image, by sensing, with the light receiving element, background light with respect to the reflected light;
preparing, using a camera, a camera image, the camera generating the camera image by sensing incident light with a camera element, the camera image having a resolution higher than a resolution of the reflected light image and a resolution of the background light image;
detecting a feature point in the background light image and a feature point in the camera image, respectively;
specifying a correspondence relationship between the feature point in the background light image and the feature point in the camera image; and
correlating, based on the specified correspondence relationship, each pixel in the background light image with a corresponding pixel in the camera image,
wherein
one of the background light image and the camera image is defined as a projection source image and the other one of the background light image and the camera image is defined as a projection destination image,
an epipolar line corresponding to the feature point of the projection source image is projected on the projection destination image, and
the feature point of the projection destination image positioned within a determination region of the epipolar line is determined as a target feature point that has the correspondence relationship with the feature point of the projection source image, and
wherein
the determination region of the epipolar line is set to have a band shape along the epipolar line with a predetermined allowable width.

9. An image registration program product stored in a computer-readable non-transitory storage medium, the image registration program product comprising instructions to be executed by at least one processor for performing an image registration to an image generated by a distance measuring sensor that is provided by a light detection and ranging (LiDAR) sensor and an image generated by a camera, the instructions comprising:
acquiring a reflected light image and a background light image from the LiDAR sensor, the LiDAR sensor generating the reflected light image, which includes distance information, by emitting light toward an object and sensing, with a light receiving element, reflected light from the object, the LiDAR sensor further generating the background light image, which has a same coordinate system as a coordinate system of the reflected light image, by sensing, with the light receiving element, background light with respect to the reflected light;
acquiring a camera image from the camera, the camera generating the camera image by sensing incident light with a camera element, the camera image having a resolution higher than a resolution of the reflected light image and a resolution of the background light image;
detecting a feature point in the background light image and a feature point in the camera image, respectively;
specifying a correspondence relationship between the feature point in the background light image and the feature point in the camera image; and
correlating, based on the specified correspondence relationship, each pixel in the background light image with a corresponding pixel in the camera image,
wherein
one of the background light image and the camera image is defined as a projection source image and the other one of the background light image and the camera image is defined as a projection destination image,
an epipolar line corresponding to the feature point of the projection source image is projected on the projection destination image, and
the feature point of the projection destination image positioned within a determination region of the epipolar line is determined as a target feature point that has the correspondence relationship with the feature point of the projection source image, and wherein the determination region of the epipolar line is set to have a band shape along the epipolar line with a predetermined allowable width.

* * * * *